United States Patent
Zubovsky

(10) Patent No.: US 12,463,813 B2
(45) Date of Patent: Nov. 4, 2025

(54) METHOD, DEVICE, AND NON-TRANSITORY COMPUTER READABLE MEDIUM FOR GENERATING AND MANAGING CRYPTOGRAPHIC KEYS

(71) Applicant: Charles Schwab & Co., Inc, San Francisco, CA (US)

(72) Inventor: Valery Zubovsky, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 288 days.

(21) Appl. No.: 18/363,210

(22) Filed: Aug. 1, 2023

(65) Prior Publication Data

US 2025/0047490 A1 Feb. 6, 2025

(51) Int. Cl.
*H04L 9/32* (2006.01)
*H04L 9/08* (2006.01)

(52) U.S. Cl.
CPC .......... *H04L 9/3213* (2013.01); *H04L 9/0891* (2013.01)

(58) Field of Classification Search
CPC ............................ H04L 9/3213; H04L 9/0891
See application file for complete search history.

(56) References Cited

U.S. PATENT DOCUMENTS

| | | | | |
|---|---|---|---|---|
| 8,020,007 B1* | 9/2011 | Zubovsky | ........... | H04L 63/0807 713/180 |
| 8,522,323 B1* | 8/2013 | Zubovsky | ............. | H04L 63/126 713/192 |
| 8,713,695 B2* | 4/2014 | Harada | ............... | H04L 63/0428 705/26.1 |
| 11,810,113 B2* | 11/2023 | Dey | ...................... | G06Q 20/401 |
| 2010/0146613 A1* | 6/2010 | Hall | ..................... | H04L 63/0807 709/229 |
| 2010/0306547 A1* | 12/2010 | Fallows | .............. | H04L 63/0815 713/178 |
| 2013/0073862 A1* | 3/2013 | Harada | ................. | H04L 67/568 713/182 |
| 2020/0145384 A1* | 5/2020 | Chauhan | ............... | H04W 12/69 |
| 2021/0288808 A1* | 9/2021 | Bahety | .................. | H04L 9/3247 |
| 2022/0038441 A1* | 2/2022 | Chauhan | ............... | H04W 12/63 |
| 2023/0102161 A1* | 3/2023 | Dey | ...................... | G06Q 20/351 705/44 |
| 2023/0283711 A1* | 9/2023 | Gupta | ................... | H04M 3/382 379/93.02 |

* cited by examiner

*Primary Examiner* — J. Brant Murphy
(74) *Attorney, Agent, or Firm* — Harness, Dickey & Pierce, P.L.C.

(57) ABSTRACT

An authorization server, method, and non-transitory computer readable medium for generating and managing at least one access token associated with a client. The authorization server may include a memory configured to store computer readable instructions; and processing circuitry configured to execute the computer readable instructions to cause the authorization server to, compute an encryption key based on information associated with a user session, embed the encryption key into the at least one access token, map, within a database, the at least one access token to an access token handle associated with the client, return the access token handle to the client, and selectively provide the access token to at least one web Application Programming Interface (API) in response to receipt of the access token handle from the at least one web API.

20 Claims, 3 Drawing Sheets

METHOD, DEVICE, AND NON-TRANSITORY COMPUTER READABLE MEDIUM FOR GENERATING AND MANAGING CRYPTOGRAPHIC KEYS

BACKGROUND

Field

Various example embodiments are related to methods, devices, and non-transitory computer readable mediums for generating and managing cryptographic keys. For example, at least some example embodiments relate to an authorization server configured to generate and manage at least one access token associated with a client by embedding a private key into at least one access token and returning, to the client, an access token handle mapped to the access token rather than the access token.

Description of the Related Art

The statements in this section merely provide background information related to example embodiments and may not constitute prior art.

A web Application Programming Interface (API) is an application programming interface for a web server or a web browser. A server-side web API consists of one or more publicly exposed endpoints to a defined request-response message system, typically expressed in JavaScript Object Notation (JSON) or Extensible Markup Language (XML) by means of an HTTP-based web server.

Any confidential information that is included in the web API's address (e.g., a universal resource locator (URL)), such as in the path and/or the query portion of the URL, may be exposed to the unauthorized parties, at a minimum, via web logs. For example, most web servers maintain access logs that record the URLs that have been used and these logs are widely available for various processes such as troubleshooting, etc. Since, as discussed above, these URLs may contain confidential information, this confidential info may be accessible to the browser as well as individuals and plug-ins with access to the web logs.

Additionally, providing confidential information to the web APIs that are accessed from in-browser applications, such as those written in JavaScript, may expose the confidential information to the unauthorized parties that have access to the web browser resources, such as the web page sources, web browser cache, history, logs, or via cross-site scripting.

Typical data protection techniques employ data encryption using a key. However, encrypted data becomes compromised if the decryption key becomes known to an unauthorized party. Therefore, proper key management may be important. However, cryptographic key management is usually the weakest part of any data protection scheme that is based on encryption. For example, conventionally, the decryption key may be stored or exposed to the client and thus accessible by an attacker, may be long-lived and indistinct per user and/or per user session, thus potentially allowing user tracking and unauthorized decryption of data, and shared among more systems than necessary.

SUMMARY

At least some example embodiments provide a cryptographic key management solution where the decryption key is not exposed to the client, is ephemeral (e.g., born and burned), time bound, distinct per user and per user session and is shared among only those systems that take part in processing the web API request such that, for example, confidential information may be encrypted with different keys over time to inhibit (or, alternatively, prevent) user tracking and unauthorized decryption of data.

Some example embodiments are directed to an authorization server configured to generate and manage at least one access token associated with a client.

In some example embodiments, the authorization server includes a memory configured to store computer readable instructions; and processing circuitry configured to execute the computer readable instructions to cause the authorization server to, compute an encryption key based on information associated with a user session with the client, embed the encryption key into the at least one access token, map, within a database, the at least one access token to an access token handle associated with the client, return the access token handle to the client, and selectively provide the access token to at least one web Application Programming Interface (API) in response to receipt of the access token handle from the at least one web API.

In some example embodiments, the authorization server is configured to compute the encryption key based on a refresh token associated with the user session.

In some example embodiments, the authorization server is configured to compute the encryption key based on the refresh token such that, while the at least one access token having the encryption key embedded therein expires during the user session, the encryption key and the refresh token used to compute the encryption key remain same during the user session and are modified during a subsequent user session.

In some example embodiments, the authorization server is configured to return the access token handle to the client in lieu of returning the access token, in response to receipt of an access token request containing the refresh token.

In some example embodiments, upon validating the client, the authorization server is further configured to map the refresh token to an authorization code, and to return the authorization code to the client.

In some example embodiments, the authorization server is further configured to subsequently return the refresh token in response to receipt of the authorization code.

In some example embodiments, the authorization server is configured to subsequently return the refresh token to a web server in response to receipt of the authorization code from the web server, the refresh token being usable by the web server to retrieve the access token handle.

In some example embodiments, the client includes one of a web browser or a mobile application outside of a secure network, and the at least one web API is within the secure network, and the authorization server is configured to return the access token handle to the web browser or to the mobile application in lieu of returning the access token, and to selectively provide the access token to the at least one web API within the secure network such that the access token remains within the secure network.

In some example embodiments, the authorization server is configured to determine whether a match exists between the access token handle received from the at least one web API and the access token handle stored within the database, and selectively provide the at least one access token to the at least one web API, in response to determining that the match exists.

In some example embodiments, the at least one web API includes a first web API and a second web API, and the authorization server is configured to, embed the encryption key into a first access token of the at least one access token and provide the first access token to the first web API, and embed the encryption key into a second access token of the at least one access token different from the first access token and provide the first access token to the first web API.

In some example embodiments, the authorization server is configured to embed the encryption key into the first access token and the second access token such that the encryption key is same in the first access token and the second access token.

In some example embodiments, the first web API is configured to perform an encryption operation on data using the encryption key embedded in the first access token to generate encrypted data, and the second web API is configured to perform a decryption operation on the encrypted data using the encryption key embedded in the second access token.

Other example embodiments relate to a method of operating an authorization server.

In some example embodiments, the method includes computing an encryption key based on information associated with a user session with a client; embedding the encryption key into at least one access token; mapping, within a database, the at least one access token to an access token handle associated with the user session; returning the access token handle to the client; and selectively providing the access token to at least one web Application Programming Interface (API) in response to receipt of the access token handle from the at least one web API.

In some example embodiments, the computing the encryption key includes computing the encryption key based on a refresh token associated with the user session.

In some example embodiments, the computing the encryption key based on the refresh token is such that, while the at least one access token having the encryption key embedded therein expires during the user session, the encryption key and the refresh token used to compute the encryption key remain same during the user session and are modified during a subsequent user session.

In some example embodiments, the returning the access token handle to the client includes returning the access token handle to the client in lieu of returning the access token, in response to receipt of an access token request containing the refresh token.

Other example embodiments relate to a non-transitory computer readable medium.

In some example embodiments, the non-transitory computer readable medium includes computer readable code that, when executed by an authorization server, configures the authorization server to: compute an encryption key based on information associated with a user session with a client; embed the encryption key into at least one access token; map, within a database, the at least one access token to an access token handle associated with the user session; return the access token handle to the client; and selectively provide the access token to at least one web Application Programming Interface (API) in response to receipt of the access token handle from the at least one web API.

In some example embodiments, the computer readable code, when executed by the authorization server, configures the authorization server to compute the encryption key based on a refresh token associated with the user session.

In some example embodiments, the computer readable code, when executed by the authorization server, configures the authorization server to compute the encryption key based the refresh token such that, while the at least one access token having the encryption key embedded therein expires during the user session, the encryption key and the refresh token used to compute the encryption key remain same during the user session and are modified during a subsequent user session.

In some example embodiments, the computer readable code, when executed by the authorization server, configures the authorization server to return the access token handle to the client in lieu of returning the access token, in response to receipt of an access token request containing the refresh token.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
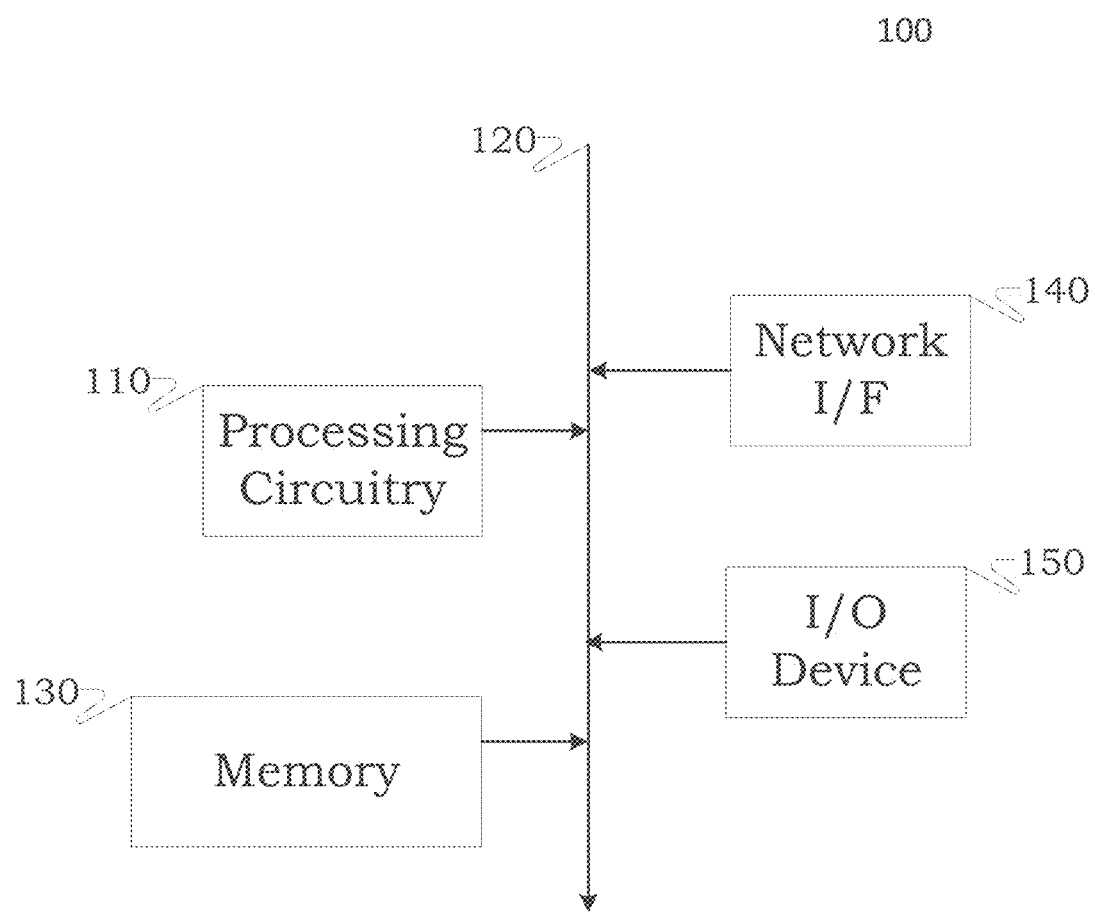
FIG. 1 illustrates an authorization server configured to secure cryptographic keys according to example embodiments.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures, and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine-readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "computer-readable medium" may include, but is not limited to, portable or fixed storage devices, optical storage devices, wireless channels, and various other mediums capable of storing, containing, or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 illustrates an authorization server configured to secure cryptographic keys according to example embodiments.

Referring to FIG. 1, an authorization server 100 may include processing circuitry 110 such as at least one processor, at least one communication bus 120, a memory 130, at least one network interface (I/F) 140. Further, the authorization server 100 may also include at least one input/output (I/O) device 150 (e.g., a keyboard, a monitor, a touchscreen, a mouse, a microphone, a camera, a speaker, etc.), etc., but the example embodiments are not limited thereto.

The memory 130 may include various special purpose program code including computer executable instructions which may cause the authorization server 100 to perform one or more of the methods of the example embodiments, including but not limited to a method of secure cryptographic keys.

In at least one example embodiment, the processing circuitry 110 may include processor cores, distributed processors, or networked processors. The processing circuitry 110 may be configured to control one or more elements of the authorization server 100, and thereby cause the authorization server 100 to perform various operations. The processing circuitry 110 is configured to execute processes by retrieving program code (e.g., computer readable instructions) and data from the memory 130 to process them, thereby executing special purpose control and functions of the entire authorization server 100. Once the special purpose program instructions are loaded into, (e.g., the at least one processor), the processing circuitry 110 executes the special purpose program instructions, thereby transforming the processing circuitry 110 into a special purpose processor.

In at least one example embodiment, the memory 130 may be a non-transitory computer-readable storage medium and may include a random-access memory (RAM), a read only memory (ROM), and/or a permanent mass storage device such as a disk drive, or a solid-state drive. Stored in the memory 130 is program code (i.e., computer readable instructions) related to securing cryptographic keys as described herein, and controlling the at least one network interface 140, and/or at least one I/O device 150, etc.

Such software elements may be loaded from a non-transitory computer-readable storage medium independent of the memory 130, using a drive mechanism (not shown) connected to the authorization server 100, or via the at least one network interface 140, and/or at least one I/O device 150, etc.

In at least one example embodiment, the at least one communication bus 120 may enable communication and/or data transmission to be performed between elements of the authorization server 100. The communication bus 120 may be implemented using a high-speed serial bus, a parallel bus, and/or any other appropriate communication technology. According to some example embodiments, the authorization server 100 may include a plurality of communication buses (not shown).

While FIG. 1 depicts an example embodiment of the authorization server 100, the authorization server 100 is not limited thereto, and may include additional and/or alternative architectures that may be suitable for the purposes demonstrated. For example, the functionality of the authorization server 100 may be divided among a plurality of physical, logical, and/or virtual server and/or computing devices, network elements, etc.

In the traditional client-server authentication model, the client requests an access-restricted resource (protected resource) on the server by authenticating with the server using the resource owner's credentials. In order to provide third-party applications access to restricted resources, the resource owner shares its credentials with the third party. Problems associated with such a traditional model include the third-party applications storage of the resource owner's credentials and their broad access to such resources leaving resource owners without any ability to restrict duration or access to the resources or easily revoke access to individual third parties without revoking access to all third parties by changing the password. Further, compromise of any third-party application may result in compromise of the end-user's password and the data protected by that password.

Rather than present resource owner's credentials, the authorization server 100 may be configured to utilize an authorization framework to allow secure API authorization by introducing an authorization layer that separates the role of the user from that of the resource owner. The authorization framework may be based on open authorization 2.0 (OAuth 2.0) framework.

Figure 2:
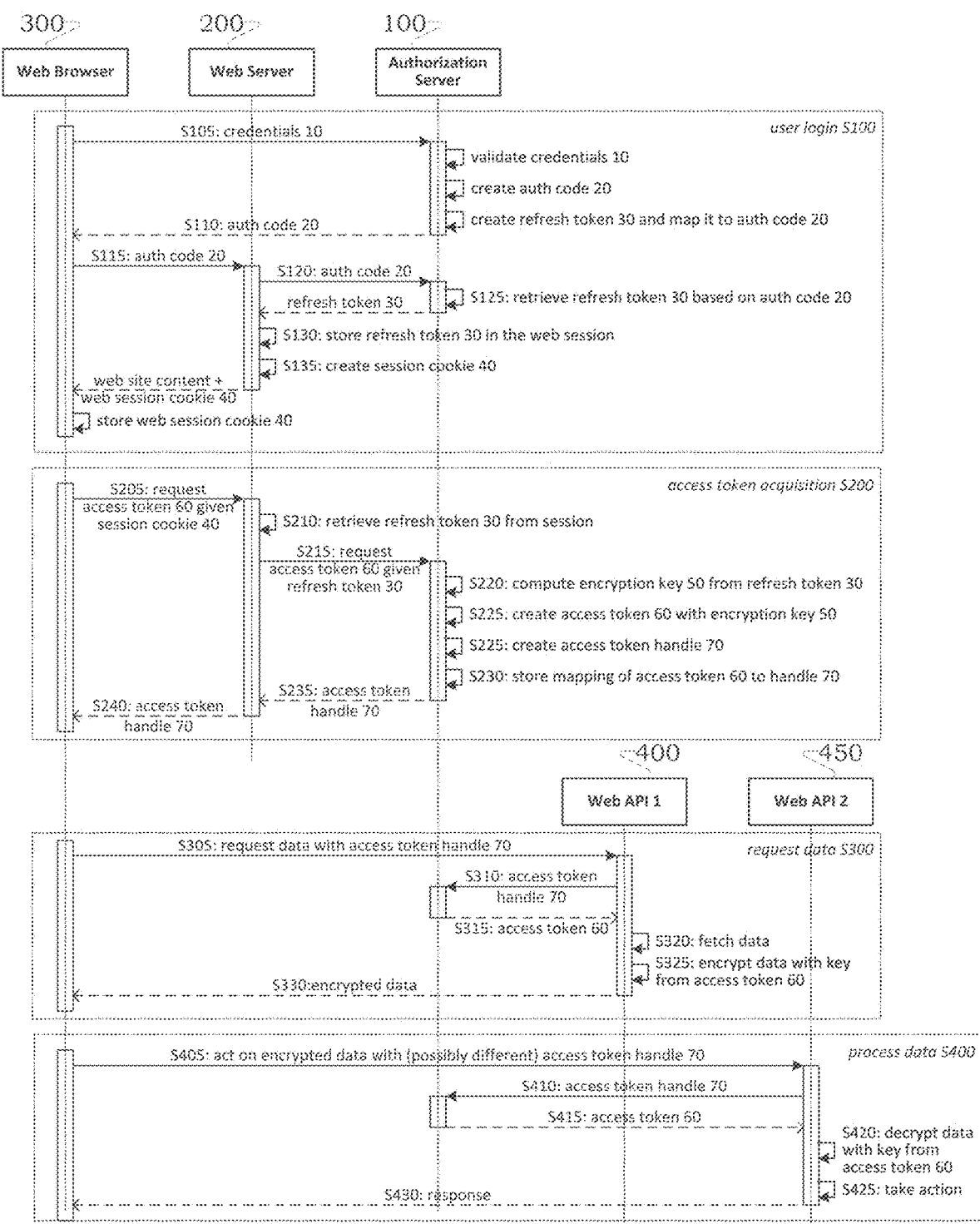
FIG. 2 illustrates a method of securing cryptographic keys according to example embodiments.

FIG. 2 illustrates a method of securing cryptographic keys according to example embodiments.

Referring to FIG. 2, as discussed in more detail below, rather than providing a web browser 300 with a valid access token 60 to access the API as in traditional authorization framework, in example embodiments, the authorization server 100 may be configured to provide a user of, for example, a web browser 300 or a mobile application 300', with a "handle" 70 associated with the access token 60, where such access token 60 is built using an encryption key 50 computed, for example, based on a refresh token 30 associated with the user session.

For example, in operation S100, the user attempting to access the protected resource via, for example, the web browser 300, may login to the authorization server 100 and cause the authorization server 100 to generate the refresh token 30 associated with the user session and return an authorization code 20 mapped to the refresh token 30 to the web browser 300.

More particularly, in operation S105, the user operating the web browser 300 may transmit their credentials (e.g., a username and a password) to the authorization server 100. In operation S110, the authorization server 100 may provide the web browser 300 with the authorization code 20. For example, after validating the user credentials 10, the authorization server 100 may create the authorization code 20 and the refresh token 30 and map the created authorization code 20 to the refresh token 30. The authorization server 100 may create the refresh token 30 such that the refresh token 30 has sufficient entropy (e.g., is sufficiently long and random) to inhibit brute force guessing of the refresh token 30. In some example embodiments, the refresh token 30 may be a Globally Unique Identifier (GUID), however, example embodiments are not limited thereto.

In operation S115, the web browser 300 may transmit such authorization code 20 to a web server 200. In operation S120, the web server 200 may forward the received authorization code 20 to the authorization server 100. In operation S125, the authorization server 100 may retrieve the previously created refresh token 30 mapped to the authorization code 20 in response to receipt of the authorization code 20, and transmit the retrieved refresh token 30 to the web server 200. In some example embodiments, the authorization server 100 may compare the authorization code 20 received from the web server 200 with the authorization code 20 previously provided by the authorization server 100 to the web browser 300, and only retrieve the refresh token 30 when the authorization code 20 received from the web server 200 matches the authorization code 20 previously provided by the authorization server 100 to the web browser 300. However, example embodiments are not limited thereto.

In operation S130, the web server 200 may store, within a web session, the refresh token 30 received from the authorization server 100. In operation S135, the web server 200 may create a session cookie 40 and transmit the session cookie 40 along with or without web site content to the web browser 300, and the web browser 300 may store the session cookie 40 for subsequent use.

Thereafter, in operation S200, the user attempting to access the protected resource via, for example, the web browser 300, may initiate an access token acquisition request to obtain an access token 60 from the authorization server 100.

However, as discussed in more detail below, rather than returning the generated access token 60 to the web browser 300, the authorization server 100 may instead return a handle 70 associated with the generated access token 60 to the web browser 300, where the web browser 300 may be under the assumption the returned handle 70 is the access token 60 itself. The web browser 300 may utilize this handle 70 to call one or more web APIs. The web APIs may be programmed to recognize that the information provided from the web browser 300 is the handle 70 rather than the access token 60 itself, and to retrieve the access token 60 with the embedded encryption key 50 from the authorization server 100, where the encryption key 50 has a limited lifespan and is computed on demand, for example, based on the refresh token 30. Since the web APIs obtain the access token 60 from the authorization server 100 rather than from the web browser 300, confidential information may be shielded from the unauthorized parties that have access to resources of the web browser 30, such as the web page sources, web browser cache, history, logs, or via cross-site scripting. Further, since the encryption key 50 is derived from the refresh token 30, which remains the same for a given a user session, the same encryption key 50 may be derived and embedded within all access tokens 60 generated within the user session. The web APIs may utilize this encryption key 50 that varies and is generated on demand (rather than prestored) to encrypt and/or decrypt data. Therefore, example embodiments provide a cryptographic key management solution where the decryption key is not exposed to the client, is ephemeral (e.g., born and burned), time bound, distinct per user and per user session and is shared among only those systems that take part in processing the web API request to inhibit (or, alternatively, prevent) unauthorized decryption of data.

For example, in operation S205, the web browser 300 may transmit the access token 60 request along with information stored in the session cookie 40 to the web server 200. In operation S210, the web server 200 may retrieve the refresh token 30 that was previously stored in the web session at operation S130, where, as discussed above, the refresh token 30 was previously provided to the web server 200 by the authorization server 100 during operation S100. Thereafter, in operation S215, the web server 200 can request the access token 60 from the authorization server 100 by embedding the refresh token 30 in the request and transmitting the same to the authorization server 100.

In operation S220, the authorization server 100 may compute an encryption key 50 using the refresh token 30 received from the web server 200. The encryption key 50 may be transported via the access token 60 where such access token 60 may have a limited lifespan such that the data may be encrypted during the lifetime of one access token 60 but decrypted during the lifetime of another access token 60. Therefore, the authorization server 100 may generate the encryption key 50 by applying the refresh token 30 as input to an algorithm, such as a symmetric algorithm, that guarantees that the same output is produced when given the same input. Therefore, the encryption key 50 may be generated in real time based on the refresh token 30 and does not have to be stored since all access tokens 60 are tied to the same refresh token 30 for a user session, and, thus, the encryption key 50 remains the same during that same user session and may be reproduced based on the refresh token 30.

While example embodiments describe that the authorization server 100 computes the encryption key 50 using the refresh token 30, example embodiments, are not limited thereto. For example, in some example embodiments, the authorization server 100 may compute the encryption key 50 from, for example, a session ID associated with the user of the web browser 300.

Further, in operation S225, the authorization server 100 may build an access token 60 and a handle 70 (hereinafter referred to as an "access token handle") associated with the access token 60. The access token 60 may be string denoting a specific scope, lifetime, and other access attributes. The access token 60 may be a JSON Web Token (JWT), however, example embodiments are not limited thereto. The authorization server 100 may build the access token 60 such that the encryption key 50 computed in operation S220 is embedded within the access token 60, and may build the handle 70 such that, unlike the access token 60, the handle 70 does not have the encryption key 50 embedded therein. The access token handle 70 may be a Globally Unique Identifier (GUID), however, example embodiments are not limited thereto. In operation S230, the authorization server 100 may store, within a database, a relationship that maps the access token 60 and the corresponding handle 70. In some example embodiments, the database may be stored within the memory 130. By embedding the encryption key 50 within the access token 60, a web API with access to the access token 60 may extract the encryption key 50 therefrom and utilize the extracted encryption key 50 to encrypt and/or decrypt data.

In operation S235, rather than returning the access token 60, the authorization server 100 may provide the web server 200 with the access token handle 70 that is paired to the access token 60, and in operation S240, the web server 200 may forward the access token handle 70 to the web browser 300.

Subsequently, in operation S300, the user may access a web API via the web browser 300 to perform an operation, such as a data request to request data from the web API.

For example, in operation S305, the web browser 300 may transmit the data request to a first web API 400. The data request may include the access token handle 70 built by the authorization server 100 and provided to the web browser 300 in operation S200.

In operation S310, the first web API 400 may forward the received access token handle 70 to the authorization server 100. In operation S315, the authorization server 100 may determine the access token 60 based on the access token handle 70 and provide the access token 60 to the first web API 400. For example, the authorization server 100 may look up the access token 60 based on the mapping relationship between the access token 60 and the access token handle 70 stored within the database to determine the access token. The access token 60 provided to the first web API 400 may include the encryption key 50 embedded therein. This differs from traditional API framework, where the first web API 400 would receive the access token 60 directly from the web browser 300, and thus is more secure since the access token 60, which contains the encryption key 50 that is used to perform encryption and decryption on the data, never leaves the secure network.

In operation S320, the first web API 400 may fetch data. In operation S325, the first web API 400 may encrypt the fetched data using the encryption key 50 embedded within the access token 60. In some example embodiments, the first web API 400 may perform the encryption using a symmetric algorithm such as Advanced Encryption Standard (AES), but example embodiments are not limited thereto.

In operation S330, the first web API 400 may transmit the encrypted data back to the web browser 300 as a response to the data request. In some example embodiments, the response may further include other unencrypted data.

After receiving the encrypted data, in operation S400, the user may access a web API via the web browser 300 to perform an operation to process the encrypted data.

For example, in operation S405, the web browser 300 may transmit a processing request to a second web API 450. The processing request may include the encrypted data provided to the web browser 300 in operation S300 and the access token handle 70 built by the authorization server 100 and provided to the web browser 300 in operation S200.

In operations S410 and S415, the second web API 450 may forward the received access token handle 70 to the authorization server 100 and receive the access token 60 from the authorization server 100 similar to operations S310 and S315, respectively, where the received access token 60 includes the encryption key 50 embedded therein.

A significant amount of time may pass between the retrieval of the encrypted data in operation S300 and the processing request in operation S400, and, thus, prior to operation S400, the access token 60 utilized in operation S300 may expire. However, even though the access token 60 itself may vary between operation S300 and S400, the encryption key 50 embedded therein may be the same since the encryption key 50 is computed based on the refresh token 30, which remains the same during the user session. Therefore, the second web API 450 may successfully decrypt the data even if the access token 60 used to encrypt the data varies between the different API calls.

In operation S420, the second web API 450 may decrypt the encrypted data received from the web browser 300. For example, the second web API 400 may utilize the encryption key 50 embedded within the access token 60 obtained from the authorization server 100 to decrypt the encrypted data. In operation S425, the second web API 450 may process the decrypted data. Thereafter, in operation S430, the second web API 450 may provide the user with a response to the processing request.

Example embodiments may improve user privacy since the encryption key 50 is generated in operation S200 based on the refresh token 30 associated with the user session. Therefore, the encryption key 50 is distinct across user sessions and any data exposed, for example, in web logs stored on the web browser 300, may not be used to correlate the user's activity in one session with the activity of the user in another session. Further, example embodiments may improve cryptographic key administration and maintenance since the encryption key 50 is based on the refresh token 30, and the life span of the refresh token 30 is limited by the user session, and, thus, the encryption key 50 automatically changes when a new user session occurs. As such, there is no need to manually change the encryption key 50. Therefore, example embodiments may produce a cryptographic key that is self-issuing, self-expiring and non-persistent.

Additionally, example embodiments may improve cryptographic key distribution, access and storage since the access token 60 having the encryption key 50 embedded therein is only provided to systems (e.g., the web API's 400, 450) within the secure environment controlled by the provider in operations S300 and S400 and the encryption key 50 is not provided to other systems including those outside the service provider's control, such as the web browser 300. This addresses an important key distribution problem, and significantly reduces the chances of an unauthorized party gaining access to the encryption key 50. Moreover, the encryption key 50 is not stored by the systems that use the encryption key 50 (e.g., the web API's 400, 450). Instead, these systems request the access token 60 having the encryption key 50 embedded therein each time access thereto is required. Thus, the probability that an unauthorized party gains access to the encryption key 50 is further reduced.

Further, example embodiments may improve the protection of the encrypted data provided to the user in operation S300. For example, the encrypted data may not be readable by unauthorized parties with access to the user's equipment since the web browser 300 is not provided with the access token, and thus, is not provided the encryption key 50 embedded therein, which is used to decrypt the encrypted data.

Figure 3:
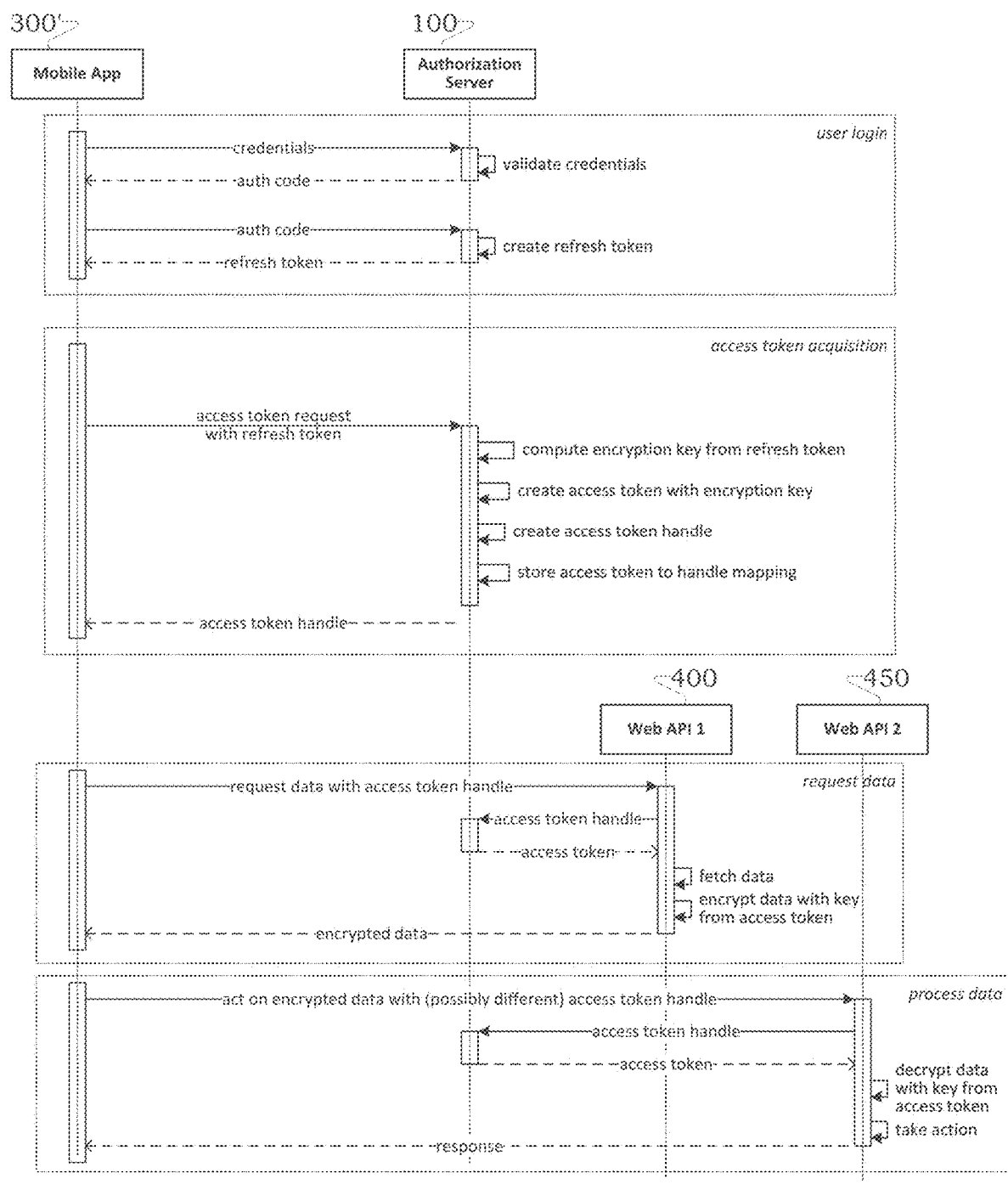
FIG. 3 illustrates a method of securing cryptographic keys according to other example embodiments.

FIG. 3 illustrates a method of securing cryptographic keys according to other example embodiments.

Referring to FIG. 3, rather than communicating with a web server 200 via a web browser, the user may access the authorization server 100 from within the mobile application 300' running on a user device. In such an environment, the refresh token 30 may be maintained within the mobile application 300' rather than the web server 200. Therefore, as shown in FIG. 3, the web browser 300 and web server 200 pair is collapsed into the mobile application 300', while the rest of the operations performed by the authorization server 100 remain the same as those described supra with reference to FIG. 2.

This written description uses examples of the subject matter disclosed to enable any person skilled in the art to practice the same, including making and using any devices, systems, and/or non-transitory computer readable media, and/or performing any incorporated methods. The patentable scope of the subject matter is defined by the claims, and may include other examples that occur to those skilled in the art. Such other examples are intended to be within the scope of the claims.

What is claimed is:

1. A method of operating an authorization server, the method comprising:
   computing an encryption key based on information associated with a user session with a client;
   embedding the encryption key into at least one access token;
   mapping, within a database, the at least one access token to an access token handle associated with the user session;
   returning the access token handle to the client; and
   selectively providing the access token to at least one web Application Programming Interface (API) in response to receipt of the access token handle from the at least one web API.

2. The method of claim 1, wherein the computing the encryption key comprises:
   computing the encryption key based on a refresh token associated with the user session.

3. The method of claim 2, wherein the computing the encryption key based on the refresh token is such that, while the at least one access token having the encryption key embedded therein expires during the user session, the encryption key and the refresh token used to compute the encryption key remain same during the user session and are modified during a subsequent user session.

4. The method of claim 2, wherein the returning the access token handle to the client comprises:
   returning the access token handle to the client in lieu of returning the access token, in response to receipt of an access token request containing the refresh token.

5. An authorization server configured to generate and manage at least one access token associated with a client, the authorization server comprising:
   a memory configured to store computer readable instructions; and
   processing circuitry configured to execute the computer readable instructions to cause the authorization server to,
      compute an encryption key based on information associated with a user session with the client, embed the encryption key into the at least one access token, map, within a database, the at least one access token to an access token handle associated with the client, return the access token handle to the client, and selectively provide the access token to at least one web Application Programming Interface (API) in response to receipt of the access token handle from the at least one web API.

6. The authorization server of claim 5, wherein the authorization server is configured to compute the encryption key based on a refresh token associated with the user session.

7. The authorization server of claim 6, wherein the authorization server is configured to compute the encryption key based on the refresh token such that, while the at least one access token having the encryption key embedded therein expires during the user session, the encryption key and the refresh token used to compute the encryption key remain same during the user session and are modified during a subsequent user session.

8. The authorization server of claim 6, wherein the authorization server is configured to return the access token handle to the client in lieu of returning the access token, in response to receipt of an access token request containing the refresh token.

9. The authorization server of claim 6, wherein upon validating the client, the authorization server is further configured to map the refresh token to an authorization code, and to return the authorization code to the client.

10. The authorization server of claim 9, wherein the authorization server is further configured to subsequently return the refresh token in response to receipt of the authorization code.

11. The authorization server of claim 10, wherein the authorization server is configured to subsequently return the refresh token to a web server in response to receipt of the authorization code from the web server, the refresh token being usable by the web server to retrieve the access token handle.

12. The authorization server of claim 5, wherein the client includes one of a web browser or a mobile application outside of a secure network, and the at least one web API is within the secure network, and the authorization server is configured to return the access token handle to the web browser or to the mobile application in lieu of returning the access token, and to selectively provide the access token to the at least one web API within the secure network such that the access token remains within the secure network.

13. The authorization server of claim 5, wherein the authorization server is configured to, determine whether a match exists between the access token handle received from the at least one web API and the access token handle stored within the database, and selectively provide the at least one access token to the at least one web API, in response to determining that the match exists.

14. The authorization server of claim 5, wherein the at least one web API includes a first web API and a second web API, and the authorization server is configured to, embed the encryption key into a first access token of the at least one access token and provide the first access token to the first web API, and embed the encryption key into a second access token of the at least one access token different from the first access token and provide the first access token to the first web API.

15. The authorization server of claim 14, wherein the authorization server is configured to embed the encryption key into the first access token and the second access token such that the encryption key is same in the first access token and the second access token.

16. The authorization server of claim 14, wherein the first web API is configured to perform an encryption operation on data using the encryption key embedded in the first access token to generate encrypted data, and the second web API is configured to perform a decryption operation on the encrypted data using the encryption key embedded in the second access token.

17. A non-transitory computer readable medium comprising computer readable code that, when executed by an authorization server, configures the authorization server to:

compute an encryption key based on information associated with a user session with a client;

embed the encryption key into at least one access token;

map, within a database, the at least one access token to an access token handle associated with the user session;

return the access token handle to the client; and selectively provide the access token to at least one web Application Programming Interface (API) in response to receipt of the access token handle from the at least one web API.

18. The non-transitory computer readable medium of claim 17, wherein the computer readable code, when executed by the authorization server, configures the authorization server to:

compute the encryption key based on a refresh token associated with the user session.

19. The non-transitory computer readable medium of claim 18, wherein the computer readable code, when executed by the authorization server, configures the authorization server to compute the encryption key based the refresh token such that, while the at least one access token having the encryption key embedded therein expires during the user session, the encryption key and the refresh token used to compute the encryption key remain same during the user session and are modified during a subsequent user session.

20. The non-transitory computer readable medium of claim 18, wherein the computer readable code, when executed by the authorization server, configures the authorization server to return the access token handle to the client in lieu of returning the access token, in response to receipt of an access token request containing the refresh token.

* * * * *